(12) United States Patent
Cress et al.

(10) Patent No.: US 8,437,111 B1
(45) Date of Patent: May 7, 2013

(54) SYSTEMS AND METHODS FOR CURRENT LIMITING WITH OVERLOAD PROTECTION

(75) Inventors: Jared D. Cress, Deatur, AL (US); Daniel M. Joffe, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 99 days.

(21) Appl. No.: 12/272,427

(22) Filed: Nov. 17, 2008

Related U.S. Application Data

(63) Continuation-in-part of application No. 11/870,979, filed on Oct. 11, 2007, now Pat. No. 8,027,461.

(51) Int. Cl.
   *H02H 9/02* (2006.01)
(52) U.S. Cl.
   USPC ..................... 361/93.9; 361/93.7
(58) Field of Classification Search .............. 361/93.1, 361/98, 100, 101, 91.1, 91.2, 91.3, 91.5, 361/93.7–93.9
   See application file for complete search history.

(56) References Cited

U.S. PATENT DOCUMENTS

| | | | |
|---|---|---|---|
| 3,810,247 A | | 5/1974 | Ono |
| 4,145,716 A | | 3/1979 | Uemura et al. |
| 4,375,073 A | * | 2/1983 | Glogolja et al. ............. 361/91.4 |
| 4,546,329 A | | 10/1985 | Unger |
| 5,374,861 A | | 12/1994 | Kubista |
| 5,467,242 A | * | 11/1995 | Kiraly .............................. 361/94 |
| 5,742,463 A | | 4/1998 | Harris |
| 5,848,150 A | | 12/1998 | Bingel |
| 6,563,864 B1 | | 5/2003 | Ibrahim et al. |
| 6,819,745 B2 | | 11/2004 | Hollenbeck et al. |
| 6,895,089 B2 | | 5/2005 | Wang |
| 7,061,740 B2 | * | 6/2006 | Mendenhall ................. 361/93.1 |
| 7,280,335 B2 | * | 10/2007 | Pritchett et al. .............. 361/93.9 |
| 7,554,783 B2 | * | 6/2009 | Heath et al. .................... 361/93.1 |
| 2002/0118500 A1 | * | 8/2002 | Covi et al. ..................... 361/93.1 |
| 2003/0002636 A1 | | 1/2003 | Nelson |
| 2005/0152080 A1 | | 7/2005 | Harris et al. |
| 2005/0180080 A1 | | 8/2005 | Harris |
| 2007/0127180 A1 | * | 6/2007 | Lin et al. ...................... 361/93.7 |

OTHER PUBLICATIONS

Dr. Richard Harris, "Introduction to TBU Protection," Fultee Semiconductor Inc., Jun. 2005.

Cress, et al., U.S. Appl. No. 11/870,073, entitled "Systems and Methods for Splitting Telecommunications Signals with Reduced Noise," filed Oct. 11, 2007.

* cited by examiner

*Primary Examiner* — Danny Nguyen

(74) *Attorney, Agent, or Firm* — Maynard Cooper & Gale, P.C.; Jon E. Holland

(57) ABSTRACT

A current limiter in one exemplary embodiment of the present disclosure has a protection element that protects a current limiting element from excessive power dissipation. The protection element senses a parameter that is indicative of an amount of power being dissipated by the current limiting element. The protection element controls the current limiting element based on the sensed parameter such that power dissipation for the current limiting element is reduced to a safe level during a fault condition thereby protecting the current limiting element from damage during the fault condition.

12 Claims, 10 Drawing Sheets

SYSTEMS AND METHODS FOR CURRENT LIMITING WITH OVERLOAD PROTECTION

CROSS REFERENCE TO RELATED APPLICATION

This application is a continuation-in-part of U.S. patent application Ser. No. 11/870,979, entitled "Systems and Methods for Splitting Telecommunication Signals with Reduced Noise," and filed on Oct. 11, 2007, which is incorporated herein by reference.

RELATED ART

Current limiters are often used to protect electrical components from damage. While the current may be limited, in harsh uncontrolled environments, such as outside plant wiring, a fault condition may significantly increase voltages across the limiter beyond the normal operating range thereby causing the circuit to dissipate excessive amounts of power. Under certain conditions, particularly when the fault condition lasts for an extended period of time, such as several seconds or minutes, the dissipated power may eventually generate enough heat to damage the current limiter and/or the circuit being protected by the current limiter.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
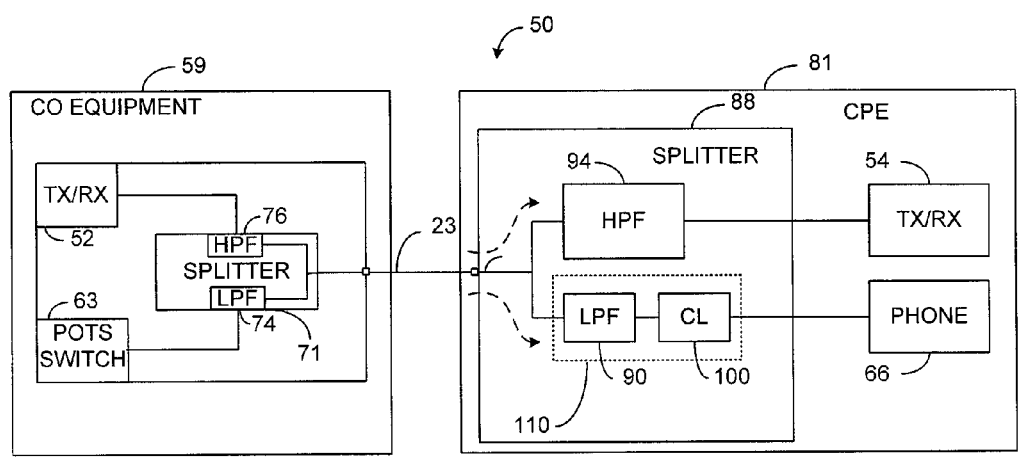
FIG. 1 is a block diagram illustrating an exemplary embodiment of a communication system in accordance with the present disclosure.

U.S. patent application Ser. No. 11/870,979, which is incorporated herein by reference, describes a current limiter coupled to a telecommunication line for limiting the current of signals communicated across the telecommunication line. By limiting such current, better isolation of signals split by a splitter is achieved. For example, by incorporating a current limiter into a splitter that splits a received signal into a broadband signal and a plain old telephone service (POTS) signal, better isolation of the broadband signal and POTS signal is achieved, thereby reducing errors in the data carried by the broadband signal.

During fault conditions, an unusually high voltage and/or current can appear on the telecommunication line. For example, the telecommunication line may be inadvertently shorted with a power line carrying a high-voltage electrical signal. A fault condition may occur for fractions of a second. In other instances, a fault condition may last longer, such as several seconds, minutes, or more. When a fault condition occurs, components coupled to the telecommunication line, such as the current limiter described above, may be damaged from excessive heat due to power dissipation.

In one exemplary embodiment, a current limiter is coupled to a protection element that monitors the power being dissipated by the current limiter. In one exemplary embodiment, the power is monitored by sensing the voltage across the current limiter. Based on power dissipation, the protection element detects when a fault condition occurs and automatically changes a state of the current limiter to protect it from the fault condition. In one exemplary embodiment, the protection element prevents current from flowing through the current limiter in response to a detected fault condition by transitioning the current limiter to a high impedance state. The current limiter may function as an open circuit in the high impedance state such that the flow of current through the limiter from the telecommunication line is prevented. Stopping or reducing the flow of current protects the current limiter, as well as components downstream of the current limiter, from excessive power dissipation due to a fault condition.

After a period of time has elapsed, the protection element automatically resets the current limiter to a low impedance state. If the fault condition is no longer present, then normal operation of the current limiter resumes. However, if the fault condition is still present, the protection element again changes a state of the current limiter so that the flow of current through the limiter is prevented or otherwise reduced. The protection element continues checking for the presence of the fault condition in such manner until the fault condition is cleared so that normal operation can resume.

Note that there are some normal operating conditions that result in high voltages on a telecommunication line. For example, ringing voltages may be present on the telecommunication line. Also, during ring trip, high voltage and current may be present on a telecommunication line for a short period of time, typically less than about 200 milli-seconds (ms). The protection element 200 preferably does not interfere with these normal operating conditions. Thus, in at least one embodiment, the protection element does not change the state of the current limiter unless the voltage across the current limiter exceeds a voltage threshold for at least a predefined time period, such as about 200 ms, although other time periods may be employed in other embodiments. The fault detection threshold and the time period are preferably coordinated with the normal operating conditions of the circuitry being protected and with the physical capabilities of the limiting element 131.

FIG. 1 depicts an exemplary frequency division communication system 50 in which a broadband signal, such as an ADSL2+ signal or other type of DSL signal, for example, and a conventional phone signal (e.g., a voiceband signal or VB signal) are transported together over a common medium 23, such as a twisted wire pair. A broadband transceiver (TX/RX) 52, which comprises a data transmitter and data receiver, at a Central Office (CO) communicates with a broadband transceiver 54, which comprises a data transmitter and data receiver, at a customer premise in a high frequency band. The transceivers 52, 54 are configured to communicate DSL signals (e.g., ADSL2+, VDSL2, etc.). In other examples, the transceivers 52, 54 can be configured to communicate other types of data signals.

Many DSL signals start around 25 kilo-Hertz (kHz) and extend into the mega-Hertz (MHz) realm. Equipment 59 at the CO comprises POTS switch 63 and communicates with a telephone 66 in a low frequency band. POTS communication typically occurs in the 200 Hz to 4000 Hz band, often referred to as the voice band (VB), but supervisory signaling may produce spurious noise at higher frequencies. At the CO, a signal splitter 71 serves to isolate the POTS and DSL services from one another by feeding the appropriate frequency band to the termination equipment 52, 63 via a low-pass filter (LPF) 74 and a high-pass filter (HPF) 76 as shown. Similarly, customer premise equipment (CPE) 81 comprises a DSL transceiver 54 and a telephone 66 connected to the medium 23, which is also referred to as a "telecommunication line," via a CPE splitter 88 comprising a LPF 90 and a HPF 94, similar to the CO splitter 71. In one embodiment, the current limiter 100 is inserted into the "tip" path of the telecommunication line 23, but it is possible for the current limiter 100 to be positioned in the "ring" path or both "tip" and "ring", if desired.

The LPF 90 is connected in series with a current limiter 100. The LPF 94 and limiter 100 form a current-limited LPF 110. U.S. patent application Ser. No. 11/870,979 describes various embodiments of the current limiter 100. The limiter 100 may be positioned in various locations, such as at the CO splitter 71 rather than customer premise splitter 88.

Figure 2:
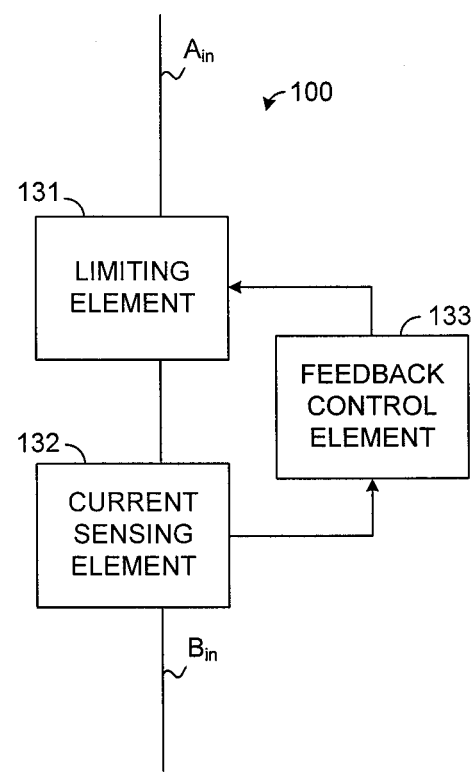
FIG. 2 is a block diagram illustrating an exemplary embodiment of a current limiter, such as is depicted in FIG. 1.

FIG. 2 depicts an exemplary embodiment of the current limiter 100. Conceptually, the limiter 100 comprises several elements, including a limiting element 131, also referred to as a "pass device," which acts to restrict the flow of current. The limiting element 131 is modulated by a feedback control element 133 such that the element 131 presents the impedance necessary to achieve the desired limiting function. The current sensing element 132 monitors the current actually flowing through the current limiter 100 at any given time as the input to the feedback control element 133.

Figure 3:
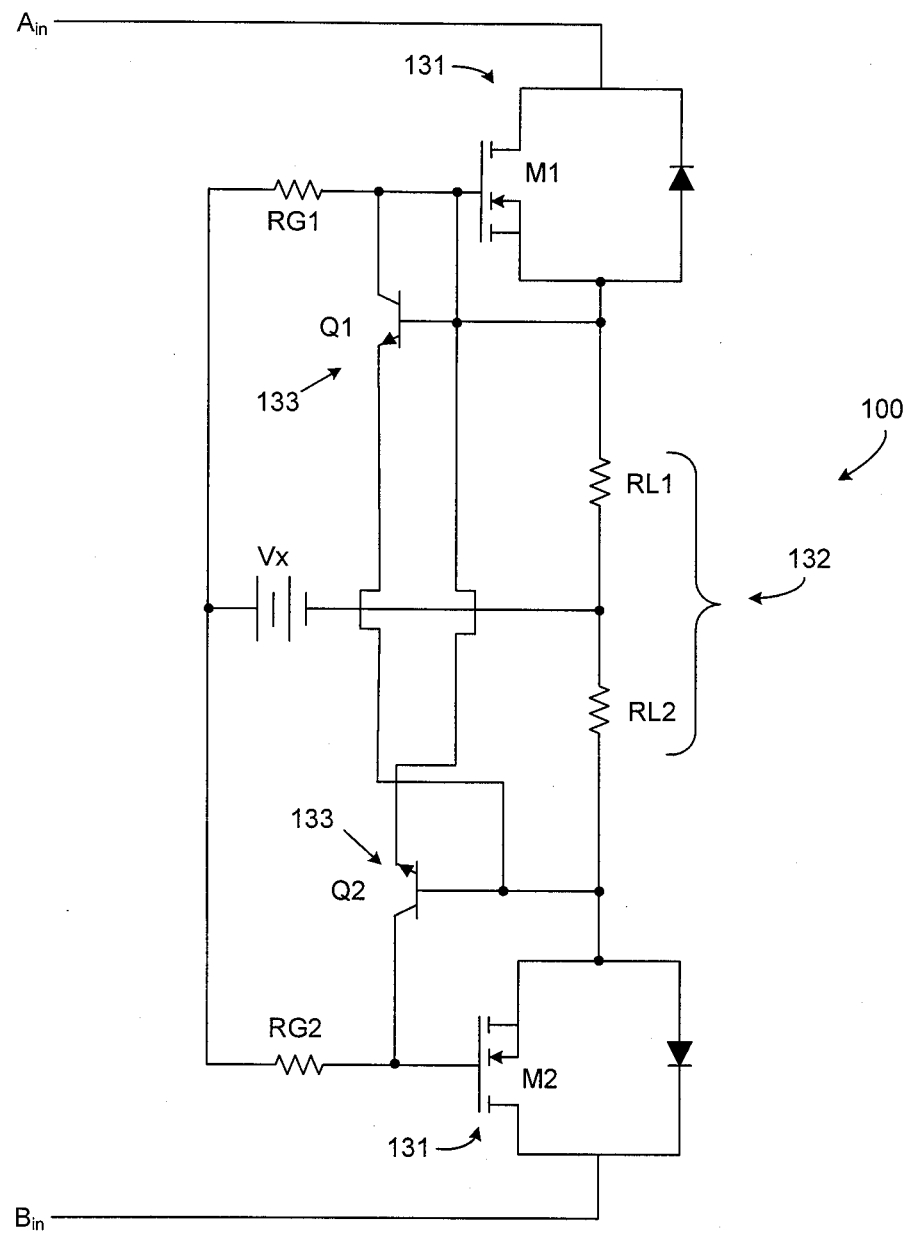
FIG. 3 is a circuit diagram illustrating an exemplary embodiment of a current limiter, such as is depicted in FIG. 2.

FIG. 3 shows a current limiter 100 based on enhancement mode field effect transistors M1 and M2 as the limiting elements 131. A voltage source Vx supplies gate-to-source voltage (Vgs) for the field effect transistors (FETs) M1 and M2, placing them in a normally conductive, low-impedance state. Various configurations of the voltage source Vx are possible. For example, in one embodiment, the voltage source Vx comprises a circuit for supplying voltage from the telecommunication line 23. In another exemplary embodiment, the voltage source Vx comprises a battery.

Resistors RL1 and RL2 of FIG. 3 form the current sensing element 132, while bipolar junction transistors (BJTs) Q1 and Q2 close the feedback control loop 133. Consider the case where node Ain is at a positive potential with respect to node Bin such that conventional current flows from Ain to Bin. When the current through the sensing element 132 develops enough voltage to turn on the base-emitter junction (Vbe(on)) of transistor Q1, transistor Q1 begins to conduct, stealing gate drive from the FET M1. This increases the impedance of FET M1, decreasing the current that flows. Transistor Q1 continues to steal M1's gate drive until the voltage developed across the current sensing element 132 reaches exactly Vbe (on) of transistor Q1, completing the feedback control 133 to transistor M1, the limiting element 131. For this polarity of current flow, transistor Q2 remains off, leaving transistor M2 in its low-impedance state. Transistors M1 and Q1 are the active limiting element 131 and feedback control element 133, respectively, for this polarity. When the voltage across the sensing element 132 drops below Vbe(on) of transistor Q1, transistor Q1 quits conducting, restoring gate drive to the transistor M1 and placing it back in a low-impedance state. Due to the symmetry of the circuitry, for the opposite polarity of input such that current flows from Bin to Ain, the principles of the circuit's operation are essentially the same with transistor M2 serving as the limiting element 131 and transistor Q2 serving as the feedback control element 133.

In the normally conductive state, this embodiment of the current limiter 100 has a total insertion resistance of (RL1+RL2+RMOS1+RMOS2) where RMOS1 and RMOS2 are the drain-to-source on resistance of FETs M1 and M2 respectively. The maximum current (Imax) allowed by the device is Vbe(on)/(RL1+RL2). For a current limit of 110 milli-Amperes (mA), a reasonable value, RL1+RL2 is about 4.53 ohms as Vbe(on) is approximately 0.5 Volts for small collector currents. Typical FET devices such as International Rectifier's IRF730 put RMOS1 and RMOS2 at roughly 1 Ohm each. This makes for a total insertion resistance of less than 7 Ohms.

Low insertion resistance is highly desirable, as additional resistance decreases the supervisory range of the POTS service and adds additional attenuation to the voiceband (VB) signals. The architecture of FIG. 3 has no deadband in the pass function that would otherwise add crossover distortion to the VB signal. As known in the art, crossover distortion generally refers to distortion caused by line voltages close to zero when the line voltage is transitioning from a positive voltage to a negative voltage or vice versa. Such distortion is typically caused by transistors turning off when the line voltage falls below the critical biasing value (Vbe(on) for BJT, Vgs for FET).

The symmetry of the instant embodiment ensures that it will perform equally well for either polarity of input signal. The action of the feedback control element 133 makes the current limit independent of various characteristics of the limiting element 131, such as the gate-to-source threshold voltage of the FETs used to implement the element 131.

Figure 4:
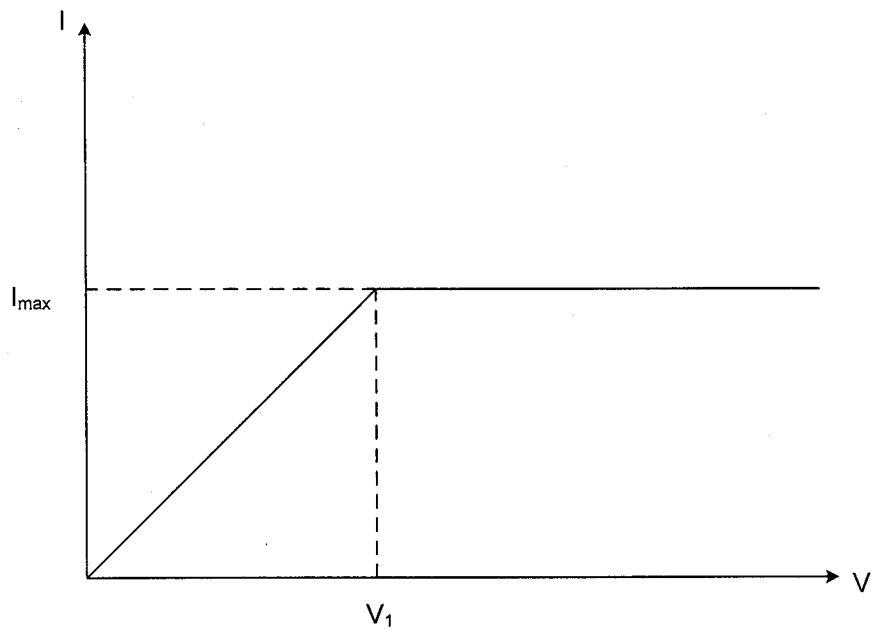
FIG. 4 is a graph illustrating an exemplary plot of voltage versus current for the current limiter depicted in FIG. 3.

FIG. 4 shows a graph of voltage (V) versus current (I) for the limiter 100 shown by FIG. 3. Up to a voltage, V1, current increases linearly with voltage (i.e., it looks resistive). However, once V1 is reached, the current limiter 100 limits the current such that the current remains substantially constant as the voltage across the limiter 100 increases. This can lead to large amounts of power being dissipated in the limiting element 131, ultimately leading to its destruction.

Figure 5:
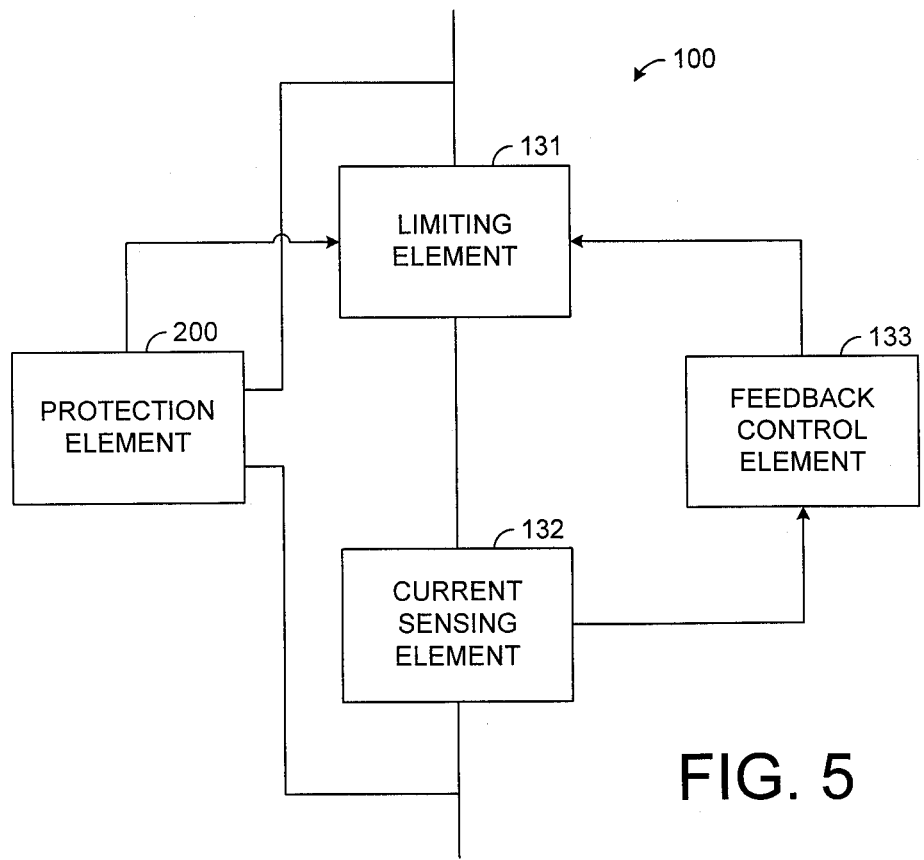
FIG. 5 is a block diagram illustrating an exemplary embodiment of a current limiter, such as is depicted in FIG. 1.
Figure 6:
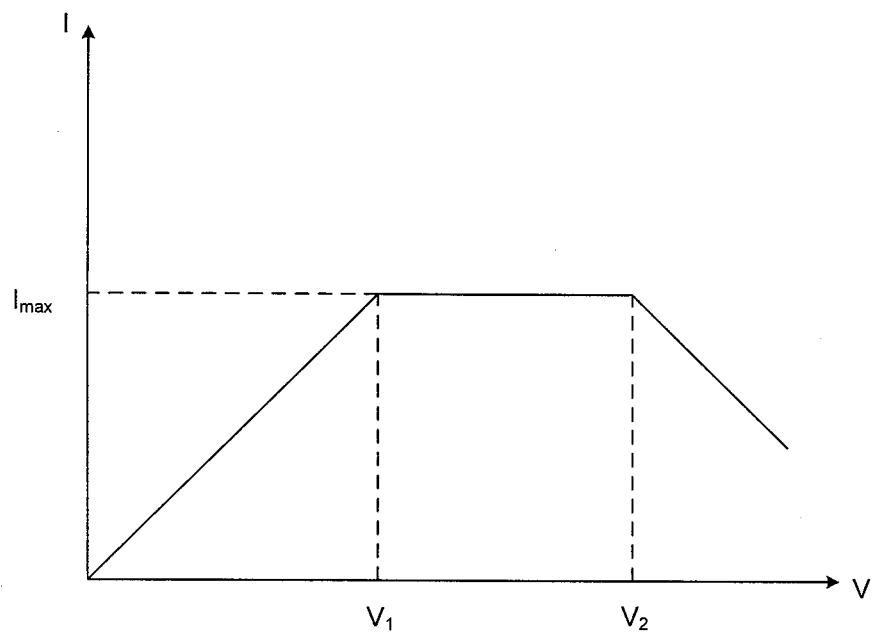
FIG. 6 is a graph illustrating an exemplary plot of voltage versus current for a current limiter, such as is depicted in FIG. 5.

FIG. 5 shows an embodiment of a current limiter 100 having a protection element 200 that protects the limiter 100 from fault conditions. In this regard, the protection element 200 monitors power dissipation of the current limiter 100 with the intent of reducing the current flow and therefore the power dissipation, should conditions be harsh enough to potentially damage the limiting element 131. In one embodiment, the current is reduced in proportion to the applied voltage, thereby reducing and bounding the power dissipation. An exemplary graph showing current versus voltage of such an embodiment is depicted by FIG. 6. In this regard, once a voltage, $V_2$, is reached, the current is decreased such that the current is inversely proportional to the voltage for voltages greater than $V_2$.

Figure 7:
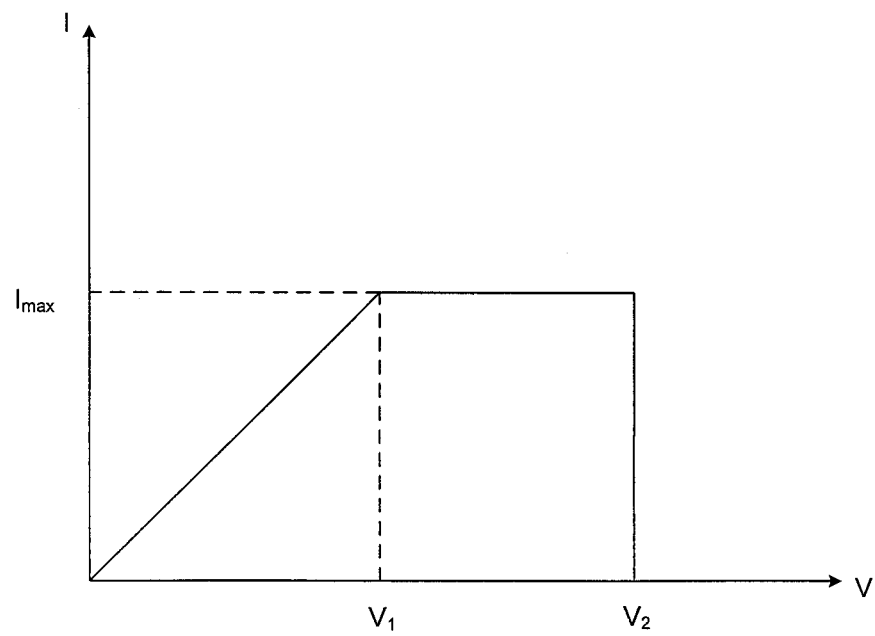
FIG. 7 is a graph illustrating an exemplary plot of voltage versus current for a current limiter, such as is depicted in FIG. 5.

In another exemplary embodiment, the current limit remains unchanged but the protection element 200 transitions the limiting element 131 to a high impedance state when the power dissipation is above a threshold. An exemplary graph showing current versus voltage of such an embodiment is depicted by FIG. 7. In this regard, when a voltage $V_2$ is reached, the current limiting element 131 is transitioned to a high impedance state such that the element 131 functions as an open circuit. Accordingly, the current goes close to zero at $V_2$, as shown by FIG. 7.

In another exemplary embodiment, the current limit remains unchanged and the protection element 200 transitions the limiting element 131 to a high impedance state, as described above in the foregoing paragraph. However, rather than transitioning to a high impedance state once a power dissipation threshold is reached, the limiting element 131 is transitioned to a high impedance state only if unfavorable conditions persist long enough to indicate that a fault condition is present, depending on the application in which the current limiter 100 is being used. For example, the protection element 200 may be configured to transition the current limiting element 131 to a high impedance state if the voltage across such element 131 exceeds a threshold for at least a predefined time period. Thus, if the threshold is exceeded but the voltage falls and remains below the threshold before expiration of the predefined time period, then the protection element 200 does not transition the limiting element 131 to a high impedance state.

In another embodiment, the methods are combined such that the protection element 200 reduces the current flow in proportion to the applied voltage to reduce power dissipation, then transitions the limiting element 131 to a high impedance state if unfavorable conditions persist long enough to indicate the presence of a fault condition.

Figure 8:
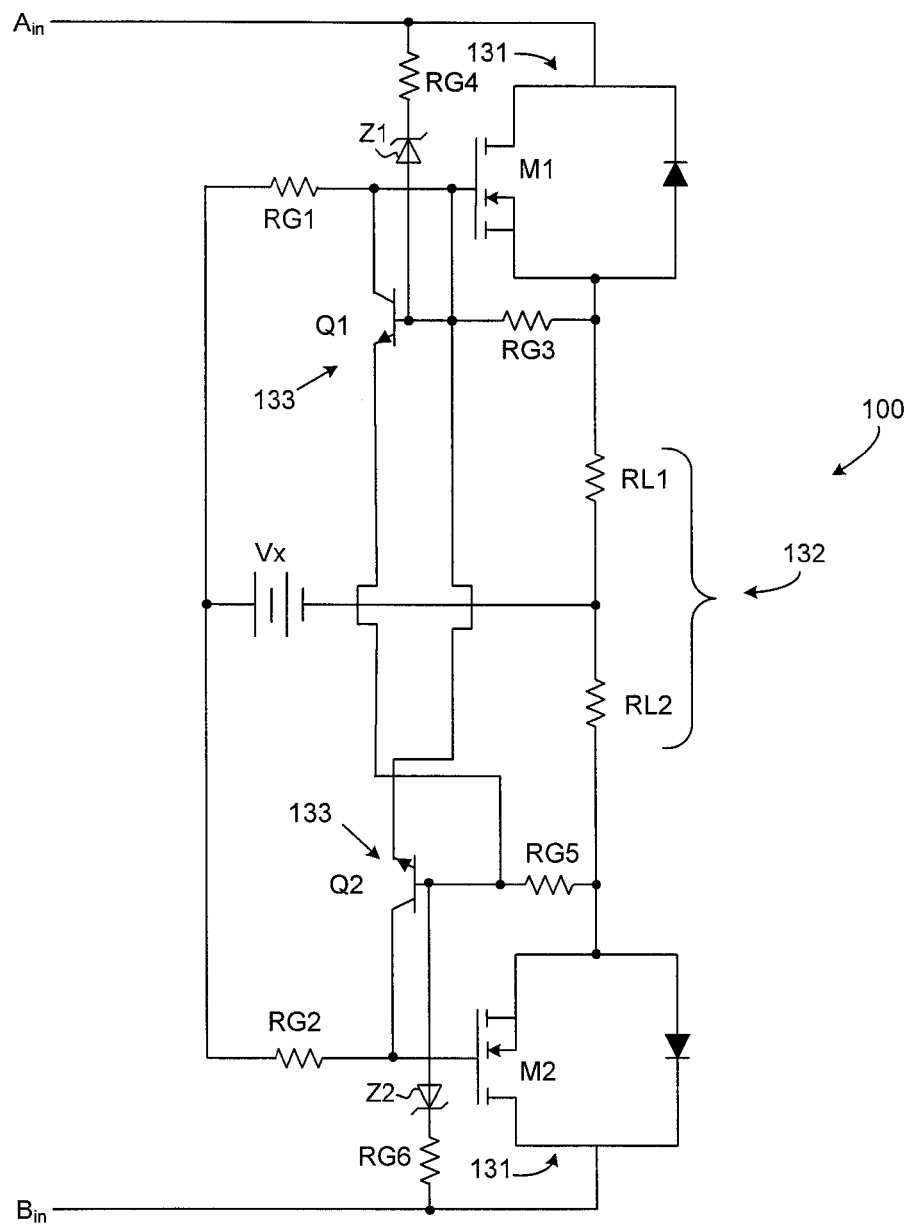
FIG. 8 is a circuit diagram illustrating an exemplary embodiment of a current limiter, such as is depicted in FIG. 5, that also limits the peak power dissipation in the limiter by reducing the current limit in proportion to the voltage across the limiter as depicted in FIG. 6.

FIG. 8 shows another embodiment of a current limiter 100. The limiter 100 of FIG. 8 is essentially the same as the limiter of FIG. 3 except that the limiter 100 of FIG. 8 has resistors RG3, RG4, RG5, and RG6, and these resistors implement a protection element 200 by reducing the current limit in proportion to the applied voltage. In addition, the limiter 100 of FIG. 8 has zener diodes Z1 and Z2 in series with resistors RG4 and RG6, respectively. An exemplary behavior of the limiter 100 of FIG. 8 is shown by FIG. 6. For voltages less than V1, the current limiter 100 looks resistive. Between voltages V1 and V2, the current limiter 100 limits the current to Imax. Beyond V2, the current is reduced as the voltage increases, setting a bound on the peak power dissipation. Note that, if desired, V1 may coincide with V2 by removing diodes Z1 and Z2. Capping the peak power dissipation to a value appropriate for the limiting element 131 helps to ensure the long-term reliability of the device.

Figure 9:
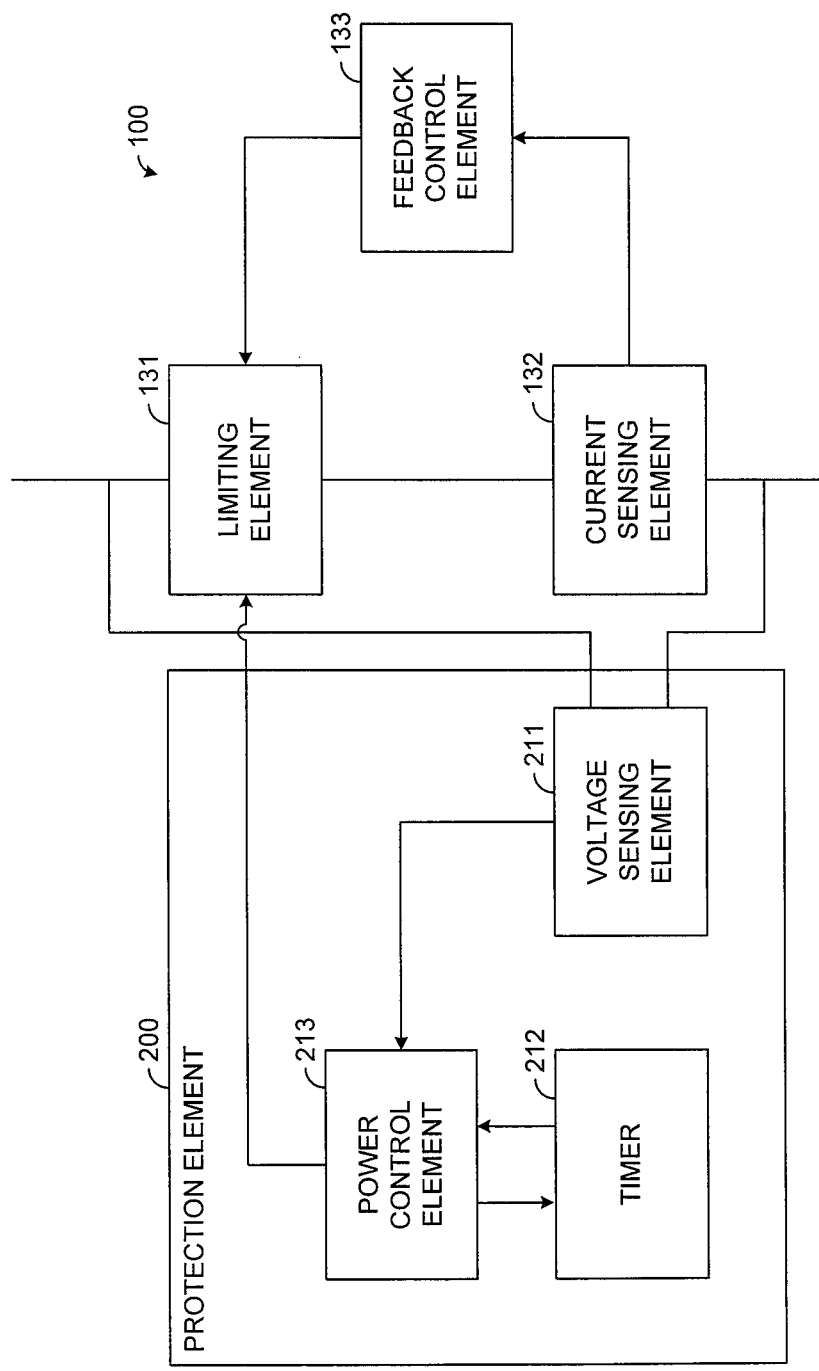
FIG. 9 is a block diagram illustrating an exemplary embodiment of a current limiter, such as is depicted in FIG. 5.

FIG. 9 depicts an exemplary embodiment of a current limiter 100 with overload protection. In the embodiment shown by FIG. 9, the protection element 200 comprises a voltage sensing element 211, a timer 212, and a power control element 213. The voltage sensing element 211 is configured to sense the voltage across the current limiting element 131. When the power control element 213 determines that the sensed voltage exceeds a threshold, referred to hereafter as the "fault threshold," the power control element 213 activates the timer 212, which expires a time period thereafter. The time between such activation of the timer 212 and its expiration is referred to herein as the "fault delay period." In one exemplary, the "fault delay period" is about 200 milli-seconds (ms), but other durations of the fault delay period are possible in other embodiments. If the sensed voltage remains above the fault threshold for the fault delay period, the power control element 213 determines that a fault condition has occurred and transmits a control signal for transitioning the current limiter 100 to a high impedance state. Thus, current is prevented from flowing through the limiter 100 from the line 23 thereby protecting the limiter 100, as well as downstream components, such as the telephone 66, from the fault condition. That is, the current limiter 100 is effectively turned off.

In addition, the timer 212 tracks the amount of time that elapses with the limiter 100 in a high impedance state. After a specified time period, referred to hereafter as the "reset period," such as about 10 seconds, for example, the timer 212 again expires. In response, the power control element 213 transmits a control signal for transitioning the current limiter 100 out of the high impedance state to a low impedance state. That is, the current limiter 100 is effectively turned on such that current is allowed to flow through it. If the fault condition has terminated such that the voltage across the input and output of the current limiting element 131 is in a normal range (e.g., below the fault threshold), then the current limiter 100 resumes normal operation. However, if the fault condition has not yet terminated such that the voltage across the current limiting element 131 is determined to be above the fault threshold at the expiration of the reset period, then the power control element 213 transitions the current limiter 100 back into the high impedance state. The limiter 100 continues transitioning into and out of the high impedance state until the fault has been resolved at which time the limiter 100 can resume normal operation.

As indicated above, after sensing a voltage higher than the fault threshold, the power control element 213 waits for a fault delay period (about 200 ms in one exemplary embodiment) before transitioning the current limiting element 131 to a high impedance state. If power dissipation is unbounded during the fault delay period, excessive power dissipation may damage the current limiting element 131 or other components. In one exemplary embodiment, the power dissipation is bounded during the fault delay period by reducing the current passing through device such that the current limit is proportional to the voltage sensed by the voltage sensing element 211, as described above for FIG. 8. At the expiration of the fault delay period, the current limiting element 131 is transitioned to a high impedance state if a fault condition is present.

Figure 10:
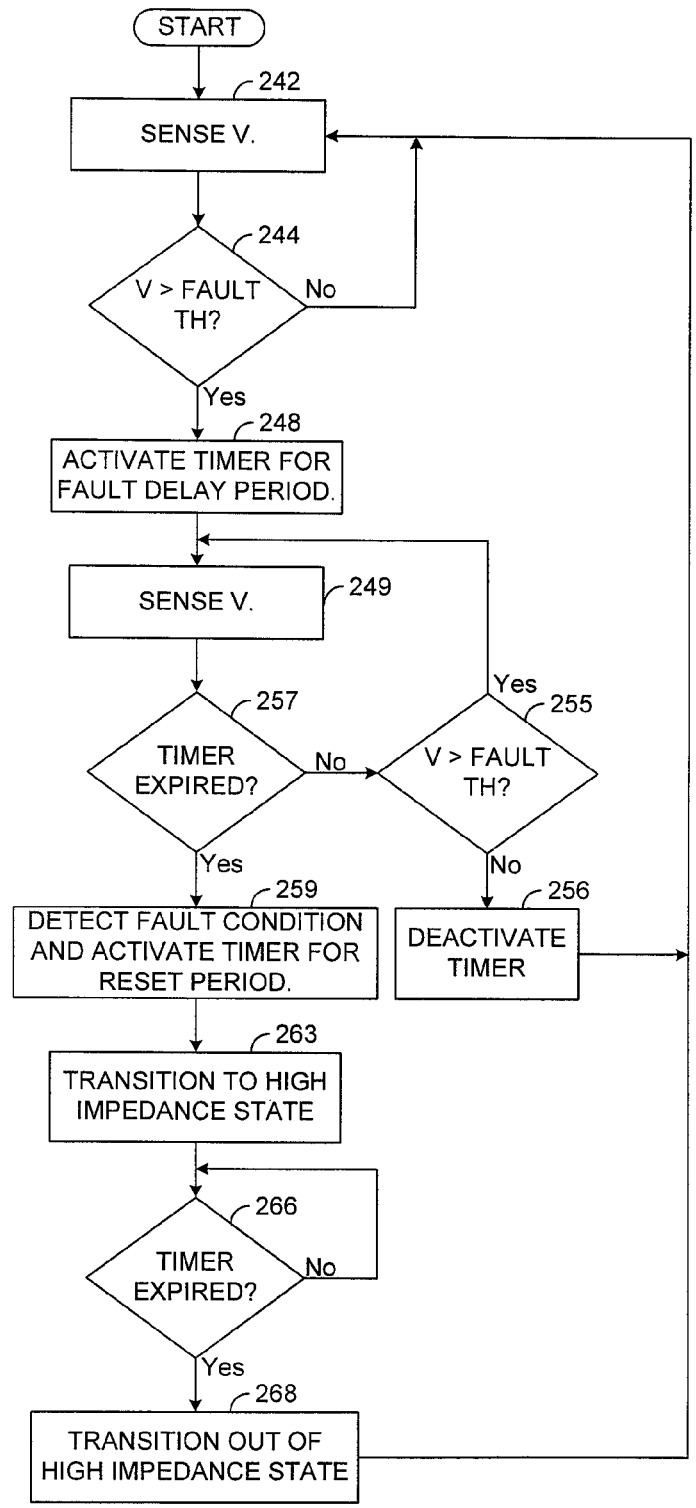
FIG. 10 is a flow chart illustrating an exemplary method of protecting a current limiter, such as is depicted in FIG. 9.

An exemplary operation and use of the protection element 200 will be described in more detail below with reference to FIG. 10.

Assume for illustrative purposes that a fault occurs causing a voltage greater than the fault threshold across the limiter 100 for a period of 15 minutes. When the fault occurs, the voltage sensing element 211 senses the voltage across the limiter 100 (which is indicative of the power being dissipated) and compares such voltage to the fault threshold, as shown by blocks 242, 244 of FIG. 10. In the instant example, the sensed voltage exceeds the fault threshold ("fault TH"). Thus, the timer 212 is activated, as shown by block 248, such that the timer 212 will expire in about 200 ms. Waiting for about 200 ms from block 248 to block 259 helps to ensure that the event is a true fault rather than a ring trip condition before the transition to a high impedance state, though other methods of making such a determination may be possible. The voltage sensing element 211 continues to sense the voltage across the limiter 100, as shown by block 249 of FIG. 10.

If the voltage across the current limiter 100 falls below the fault threshold before the timer 212 expires, the timer is deactivated, as shown by blocks 255, 256, and the limiter 100 is not transitioned to a high impedance state. The process returns to block 242 to continue monitoring the voltage across the current limiter 100.

However, in the instant example, the fault has not yet been cleared. Accordingly, the timer 252 expires about 200 ms after activation. Upon expiration of the timer 212, the power control element 213 detects a fault condition and activates the timer 212 such that it will now expire in about 10 seconds, as shown by blocks 257, 259 of FIG. 10. In response to detection of the fault condition, the power control element 213 transitions the current limiter 100 to a high impedance state, as shown by block 263. After about 10 seconds, the timer 212 expires causing the power control element 213 to transition the limiter 100 out of the high impedance state, as shown by blocks 266, 268.

Since the fault is still present upon the occurrence of block 268 in the current example, the limiter 100 is transitioned back into the high impedance state about 200 ms after reset. The limiter 100 continues switching into and out of the high impedance state until the voltage across the current limiter 100 falls back below the fault threshold indicating that the fault is no longer present. Once fault is resolved, the limiter 100 is switched to the low impedance state.

It would be apparent to one of ordinary skill in the art upon reading this disclosure that various modifications to the limiter 100 and/or the exemplary process described above are possible. For example, in the exemplary embodiment described above, the timer 212 is activated in block 248 such that it expires in about 200 ms, and the timer 212 is activated in block 259 such that it expires in about 10 seconds. Other expiration time periods are possible in other embodiments. In fact, it is possible to implement the limiter 100 without a timer 212. In such an embodiment, the power control element 213 may be configured to transition the current limiter 100 to the high impedance state in response to an indication from the voltage sensing element 211 that the fault threshold is exceeded without waiting for a fault delay period. However, waiting for at least about 200 ms in an embodiment in which the current limiter 100 is coupled to a telecommunication line 23 helps to prevent a false detection of a fault condition due to a ring trip.

Further, in one exemplary embodiment, as will be described in more detail hereafter, the timer 212 is implemented via a charged capacitor that begins to discharge when the fault threshold is exceeded. When the charge falls below a specified threshold, the timer 212 is deemed to expire. In such an embodiment, deactivation of the timer 212 can be achieved by stopping the discharge of the capacitor allowing the capacitor to recharge to its fully charged state. After initiating deactivation of the capacitor (thereby allowing the capacitor to charge) but before the capacitor is fully charged, it is possible for the voltage across the limiter 100 to rise above the fault threshold. In such a case, the capacitor begins discharging again. However, since the discharging begins before the capacitor is fully charged, it does not take the full fault delay period for the timer 212 to now expire. Thus, once the fault threshold is exceeded thereby starting the fault delay period and before the capacitor thereafter becomes fully charged, a transient perturbation of the voltage across the limiter 100 causing the sensed voltage to briefly fall below the fault threshold does not restart the fault delay period. Instead, the fault delay period is extended by about the same amount of time that the sensed voltage remains below the fault threshold due to the transient perturbation. Thus, if the sensed voltage falls below the fault threshold only briefly, then the timer 212 expires in about the same amount time that it would have expired had the sensed voltage remained above the fault threshold.

In addition, the current limiter 100 may be configured such that it is manually reset by a user rather than automatically resetting after a reset period. In another embodiment, reset may be based on a determination by the voltage sensing element 211 such that it only occurs when the voltage sensing element 211 is sensing the voltage across the current limiter 100 to be below the fault threshold or some other threshold. Various other modifications would be apparent to one of ordinary skill in the art upon reading this disclosure.

Figure 11:
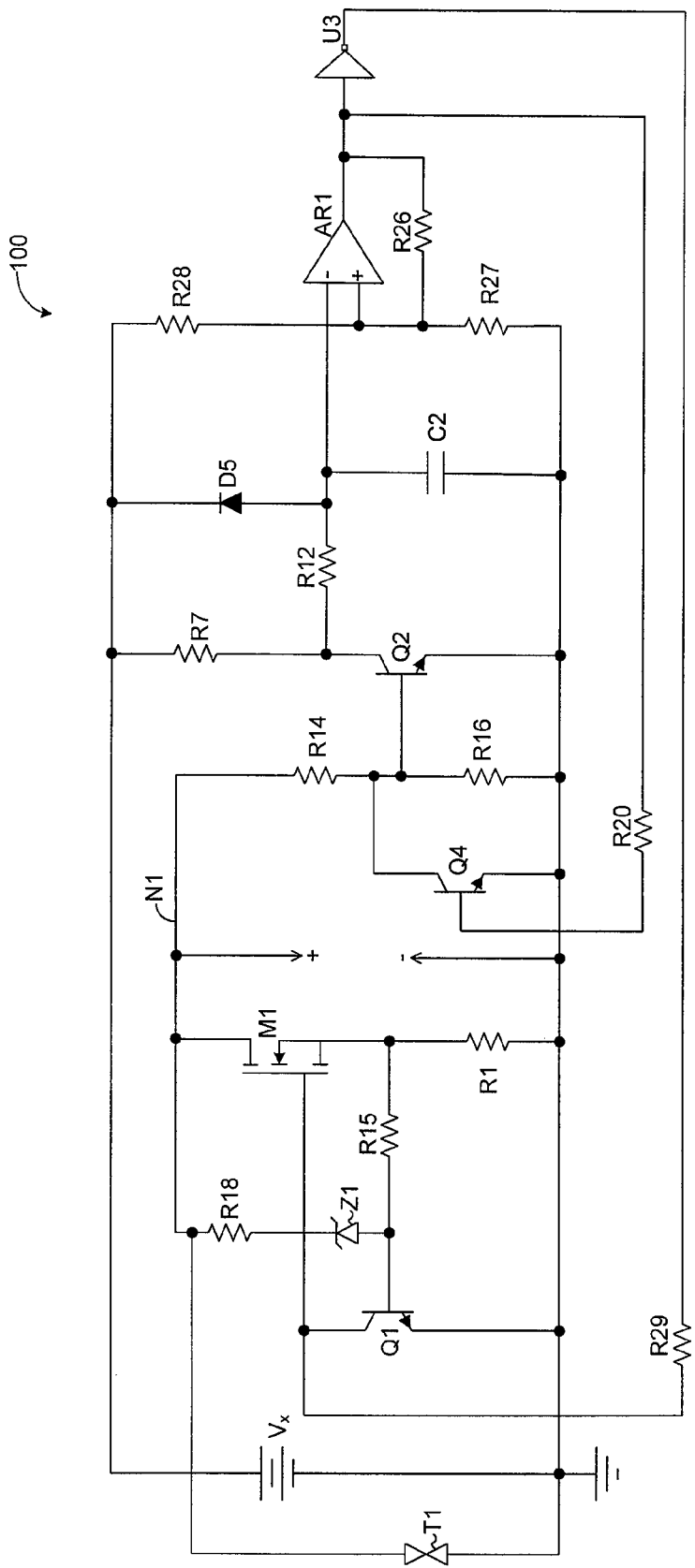
FIG. 11 is a circuit diagram illustrating an exemplary embodiment of a unipolar current limiter, such as is depicted in FIG. 9.

FIG. 11 depicts an exemplary circuit implementation of the current limiter 100 depicted by FIG. 9. For simplicity of illustration, FIG. 11 depicts the circuit components for one polarity of current. A symmetrical circuit may also be used to create a bipolar limiter.

Figure 12:
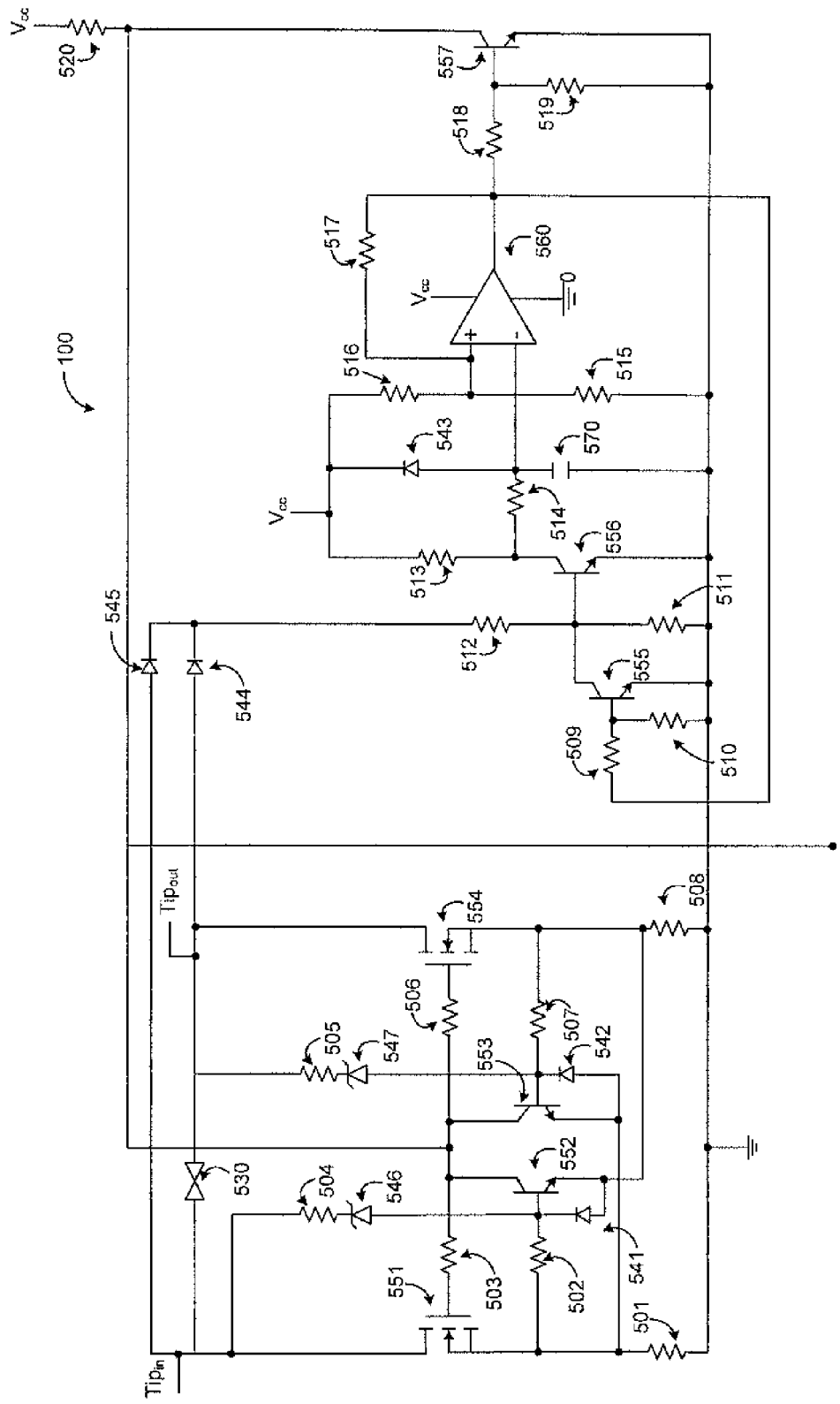
FIG. 12 is a circuit diagram illustrating an exemplary embodiment of a bipolar current limiter, such as is depicted in FIG. 9.

Referring to FIG. 11, node N1 represents the input connection. A basic current limiter consists of a limiting element 131, a current sensing element 132, and a feedback control element 133. In the embodiment of FIG. 12, these elements are implemented as FET M1, resistor R1, and BJT Q1, respectively Resistors R14, R16 implement the voltage sensing element 211. In this regard, the resistors R14 and R16 form a voltage divider that monitors the voltage across the transistor M1. The ratio of these resistors determines the fault threshold. The limiter 100 has a voltage source Vx. The remainder of the circuit components implement the protection element 200. Resistors R18, R15 and diode Z1 cause the current limit to be proportional to the voltage across the limiter. This caps the peak power dissipation in FET M1 as previously described. Limiting of the power dissipation in this manner can be particularly useful to protect the current limiting element 131 from damage during the fault delay period, if there is such a delay period. Note that resistor R18 and diode Z1 can be removed (open circuit), if desired, such that capping of the peak power does not occur before the transition to the high impedance state during the fault condition. Such a configuration may be desirable for applications in which it is desirable for the current limit not to droop.

Resistor R15 also provides some protection for the base-emitter junction of Q1. Resistors R7, R12, capacitor C2, comparator AR1, transistors Q2 and Q4, and inverter U3 implement the timer 212 and power control element 213. Essentially, the capacitor C2 charges through resistors R7, R12 and discharges through the resistor R12, transistor Q2. This asymmetry in time constants allows the "fault delay period" to be set independently of the "reset period". A diode D5 helps to protect the circuit but is otherwise unnecessary. Transistor Q4 ensures that the timer can determine the "reset period" regardless of the loop conditions. The circuit also comprises a thyristor T1, which prevents voltages in excess of the drain-to-source voltage ($V_{ds}$) breakdown for transistor M1.

During normal operation, the voltage across the limiter 100 is below the "fault threshold", leaving transistor Q2 in a non-conductive state and capacitor C2 fully charged. The output of comparator AR1 is low, keeping transistor Q4 off, and the inverter U3 supplies gate drive to pass device M1. If the current through resistor R1 is sufficient to turn on transistor Q1, the gate drive of transistor M1 is stolen and the limiter impedance rises. If the voltage at node N1 (i.e., the voltage across transistor M1 and resistor R1) then rises in excess of the fault threshold, transistor Q2 turns on starting a discharge of the capacitor C2 thereby implementing block 248 of FIG. 10. When the voltage across capacitor C2 falls below a threshold, referred to hereafter as the "discharge threshold," the output of comparator AR1 goes high. The fault delay period is the time it takes to reach this discharge threshold from the start of discharging.

The output of the comparator AR1 is inverted by inverter U3, and the transition of the inverter output from a high to a low indicates a detection of a fault condition. That is, the transition of the output of the inverter U3 indicates expiration of the timer 212 in block 257 of FIG. 10.

When the inverter U3 transitions to a low state, the gate voltage of transistor M1 is removed thereby turning off transistor M1 such that no current flows thereby transitioning the limiter 100 into a high impedance state. With the output of comparator AR1 being high, transistor Q4 turns on, shutting off transistor Q2. Capacitor C2 begins charging. When the voltage across capacitor C2 exceeds a threshold, referred to hereafter as the "reset threshold," the comparator AR1 goes low. In one exemplary embodiment, the time required for the reset threshold to be reached is about 10 seconds.

When the reset threshold is exceeded, the low output by the comparator AR1 is inverted by the inverter U3, thereby turning on the transistor M1. Thus, the current limiter 100 is reset such that it is transitioned from the high impedance state to a low impedance state. If the fault has been removed, the current limiter 100 resumes normal operation. If not, the process repeats.

FIG. 12 depicts an exemplary embodiment implementing a bi-polar current limiter 100 based on the design shown by FIG. 11. The bi-polar current limiter 100 has a plurality of resistors 501-520, a thyristor 530, a plurality of diodes 541-547, a plurality of transistors 551-557, a comparator 560, and a capacitor 570, which are all interconnected as shown by FIG. 12. In addition, the circuitry shown by FIGS. 11 and 12 are exemplary and other circuit designs may be employed in other embodiments. Note that the ground symbol in FIGS. 11 and 12 is a local reference only. There is no connection to earth ground.

Further, in the embodiments shown by FIGS. 11 and 12, the current limiter 100, including the protection element 200, is implemented via analog circuitry. In other embodiments, other types of logic may be used to implement the current limiter 100. For example, digital circuitry, such as logic gates and/or a microprocessor (or other processing element) encoded with software, may be used, if desired. However, the analog circuit components described herein have various advantages that may make the use of such components or other similar analog circuit components desirable in some applications.

In this regard, analog circuit components are sometimes less expensive and, in some cases, can have a smaller footprint than comparable digital circuit components. Further, the power requirements of analog components can sometimes be less. Indeed, in the exemplary embodiments shown by FIGS. 11 and 12, the current limiter 100 draws from the voltage source Vx current on the order of micro-Amperes (μA), which is orders of magnitude lower than many other implementations. Such low power requirements help to extend battery life in embodiments that employ a battery to implement the voltage source Vx. Even if the voltage source Vx is configured to utilize power from the telecommunication line 23 instead of a battery, such low power requirements are desirable to help prevent the current limiter 100 from interfering with the operation of the telecommunication line 23.

In various embodiments described above, the current limiter 100 is described in the context of a telecommunication application in which the limiter 100 is coupled to a telecommunication line 23. However, the various embodiments of the protection element 200 may be used to protect current limiters in other types of applications and to protect current limiters of various types, including known current limiters not specifically described by this disclosure.

Now, therefore, the following is claimed:

1. A current limiter, comprising:
   a current limiting element;
   a current sensing element configured to sense current flowing through the current limiting element;
   a voltage sensing element configured to sense a voltage across the current limiting element;
   a feedback control element configured to control the current limiting element based on the sensed current such that the current is limited by the current limiting element when the sensed voltage is between a first threshold and a second threshold; and
   a protection element configured to control the current limiting element based on the sensed voltage such that the current is inversely proportional to the voltage when the sensed voltage is greater than the first and second thresholds, thereby protecting the current limiting element from damage during a fault condition.

2. The current limiter of claim 1, wherein the current limiting element is coupled to a telecommunication line.

3. The current limiter of claim 1, wherein the protection element comprises a timer configured to expire a predefined time period after the protection element determines that the voltage exceeds the second threshold.

4. The current limiter of claim 1, wherein the protection element is configured to transition the current limiting element from a conducting state to a high impedance state in response to a determination that the sensed voltage exceeds a threshold for a predefined time period.

5. The current limiter of claim 1, wherein the protection element is configured to transition the current limiting element from a conducting state to a high impedance state in response to a detection of the fault condition.

6. The current limiter of claim 1, wherein the current limiter is coupled in cascade to a first filter that is coupled to a telecommunication line, wherein the first filter is configured to filter a combined signal from the telecommunication line to provide a first signal in a first frequency band, wherein the current limited by the current limiter is from the first signal, wherein the telecommunication line is coupled to a second filter that is configured to filter the combined signal from the telecommunication line to provide a second signal in a second frequency band different than the first frequency band, and wherein the current limiter is configured to limit the current such that noise in the second signal is reduced.

7. The current limiter of claim 1, wherein the protection element is configured to compare the sensed voltage to a threshold and to determine whether the sensed voltage exceeds the compared threshold for a predefined time period, the protection element further configured to transition the current limiting element from a conducting state to a high impedance state while the sensed voltage is above the first and second thresholds in response to a determination that the sensed voltage exceeds the compared threshold for the predefined time period.

8. A method for use in a current limiter, comprising the steps of:
   sensing current passing through the current limiter;

limiting the current passing through the current limiter based on the sensed current when a voltage across the current limiter is between a first threshold and a second threshold;

detecting a fault condition based on an amount of power being dissipated by the current limiter; and changing a state of the current limiter in response to the detecting step such that the current is inversely proportional to the voltage when the voltage is greater than the first and second thresholds, thereby protecting the current limiter from damage during the fault condition.

9. The method of claim 8, further comprising the step of receiving the current from a telecommunication line.

10. The method of claim 8, further comprising the steps of:

sensing the voltage across the current limiter; and comparing the sensed voltage to a threshold, wherein the detecting step is based on the comparing step.

11. The method of claim 8, further comprising the step of sensing the voltage, wherein the changing step is based on the sensed voltage.

12. The method of claim 8, further comprising the steps of:

determining whether the fault condition persists for a predefined time period; and transitioning the current limiter to a high impedance state based on the determining step.

\* \* \* \* \*